United States Patent
Arteaga

(10) Patent No.: US 10,683,934 B2
(45) Date of Patent: Jun. 16, 2020

(54) ROLLING ANNULAR SEAL

(71) Applicant: Cameron International Corporation, Houston, TX (US)

(72) Inventor: Nicolas Arteaga, Jersey Village, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 16/032,392

(22) Filed: Jul. 11, 2018

(65) Prior Publication Data

US 2020/0018397 A1    Jan. 16, 2020

(51) Int. Cl.
*F16J 15/32* (2016.01)
*F16J 15/48* (2006.01)
*E21B 33/072* (2006.01)
*E21B 33/00* (2006.01)

(52) U.S. Cl.
CPC ............. *F16J 15/32* (2013.01); *E21B 33/072* (2013.01); *F16J 15/48* (2013.01); *E21B 2033/005* (2013.01)

(58) Field of Classification Search
CPC .......... F16J 15/32; F16J 15/48; E21B 33/072; E21B 43/127; E21B 33/08; E21B 2033/005
See application file for complete search history.

(56) References Cited

U.S. PATENT DOCUMENTS

| 185,402 | A | * | 12/1876 | McMillan | F16J 15/32 277/500 |
| 207,871 | A | * | 9/1878 | Horton | F16J 15/32 277/448 |
| 1,897,804 | A | * | 2/1933 | Hoffman | E21B 33/08 277/344 |
| 2,555,145 | A | * | 5/1951 | McKinney | E21B 33/072 254/29 R |
| 3,116,932 | A | | 1/1964 | Mallinkckrodt | |
| 3,172,476 | A | * | 3/1965 | Voliva | E21B 33/04 166/189 |
| 3,275,334 | A | * | 9/1966 | Voitik | F16J 15/32 277/374 |
| 5,088,559 | A | * | 2/1992 | Taliaferro | E21B 19/22 166/102 |
| 5,217,068 | A | * | 6/1993 | Newton | E21B 33/08 166/84.2 |
| 9,605,506 | B1 | * | 3/2017 | Jameson | E21B 33/08 |

* cited by examiner

*Primary Examiner* — James G Sayre
(74) *Attorney, Agent, or Firm* — Helene Raybaud

(57) ABSTRACT

Sealing assemblies with rolling annular seals are provided. In one embodiment, an apparatus includes a stuffing box having a rolling seal positioned in a body for sealing against a tubing or wireline cable received in a bore of the body. The rolling seal can rotate within the body to roll along the tubing or wireline cable in response to movement of the tubing or wireline cable through the body and friction between the rolling seal and the tubing or wireline cable. Additional systems, devices, and methods are also disclosed.

9 Claims, 8 Drawing Sheets

ROLLING ANNULAR SEAL

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in finding and extracting oil, natural gas, and other subterranean resources from the earth. Particularly, once a desired subterranean resource such as oil or natural gas is discovered, drilling and production systems are often employed to access and extract the resource. These systems may be located onshore or offshore depending on the location of a desired resource.

Further, such systems generally include a wellhead assembly through which the resource is accessed or extracted. These wellhead assemblies may include a wide variety of components, such as various casings, valves, sealing assemblies, fluid conduits, and the like, that control drilling or production operations. Various tools can be run into wells through the wellhead assemblies for formation evaluation or sampling. In some instances, such tools are lowered into wells by cables or tubulars, such as wireline cables or coiled tubing. Preventers, stuffing boxes, or other sealing assemblies can be used to seal about cables or tubulars as they are run into or pulled from wells.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Some embodiments of the present disclosure generally relate to sealing assemblies having a rolling seal for sealing against a cable or tubing. In one embodiment, a sealing assembly includes a housing and a rolling seal positioned within the housing. The housing includes a bore for receiving a cable or tubing and the rolling seal can be a toroidal seal positioned along the bore so as to receive the cable or tubing through the rolling seal, which seals against the cable or tubing and forms a pressure barrier within the housing. Movement of the cable or tubing through the bore can cause the rolling seal to dynamically roll along the exterior of the cable or tubing, rather than remaining static, while maintaining sealing contact with the cable or tubing. Such a sealing assembly can be a stuffing box at a wellhead, for example, and in at least some embodiments can be used for wireline, stripping, or snubbing operations.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Wells are generally drilled into subsurface rocks to access fluids, such as hydrocarbons, stored in subterranean formations. The formations penetrated by a well can be evaluated for various purposes, including for identifying hydrocarbon reservoirs within the formations. During drilling operations, one or more drilling tools in a drill string may be used to test or sample the formations. Following removal of the drill string, a wireline tool may also be run into the well to test or sample the formations. These drilling tools and wireline tools, as well as other wellbore tools conveyed on coiled tubing, slickline, drill pipe, casing, or other means of conveyance, are also referred to herein as "downhole tools." A downhole tool may be employed alone or in combination with other downhole tools in a downhole tool string.

The measurements taken by downhole tools may be used, for example, to determine downhole conditions or to identify characteristics of formations surrounding boreholes in which the downhole tools are deployed. Some downhole tools include sensors for measuring downhole parameters, such as temperature, pressure, viscosity, resistivity, and the like. Downhole tools can also include various imaging devices and logging devices. The measurements acquired via such downhole tools may be useful in assessing downhole conditions, understanding formation characteristics, and directing oilfield operations.

Figure 1:
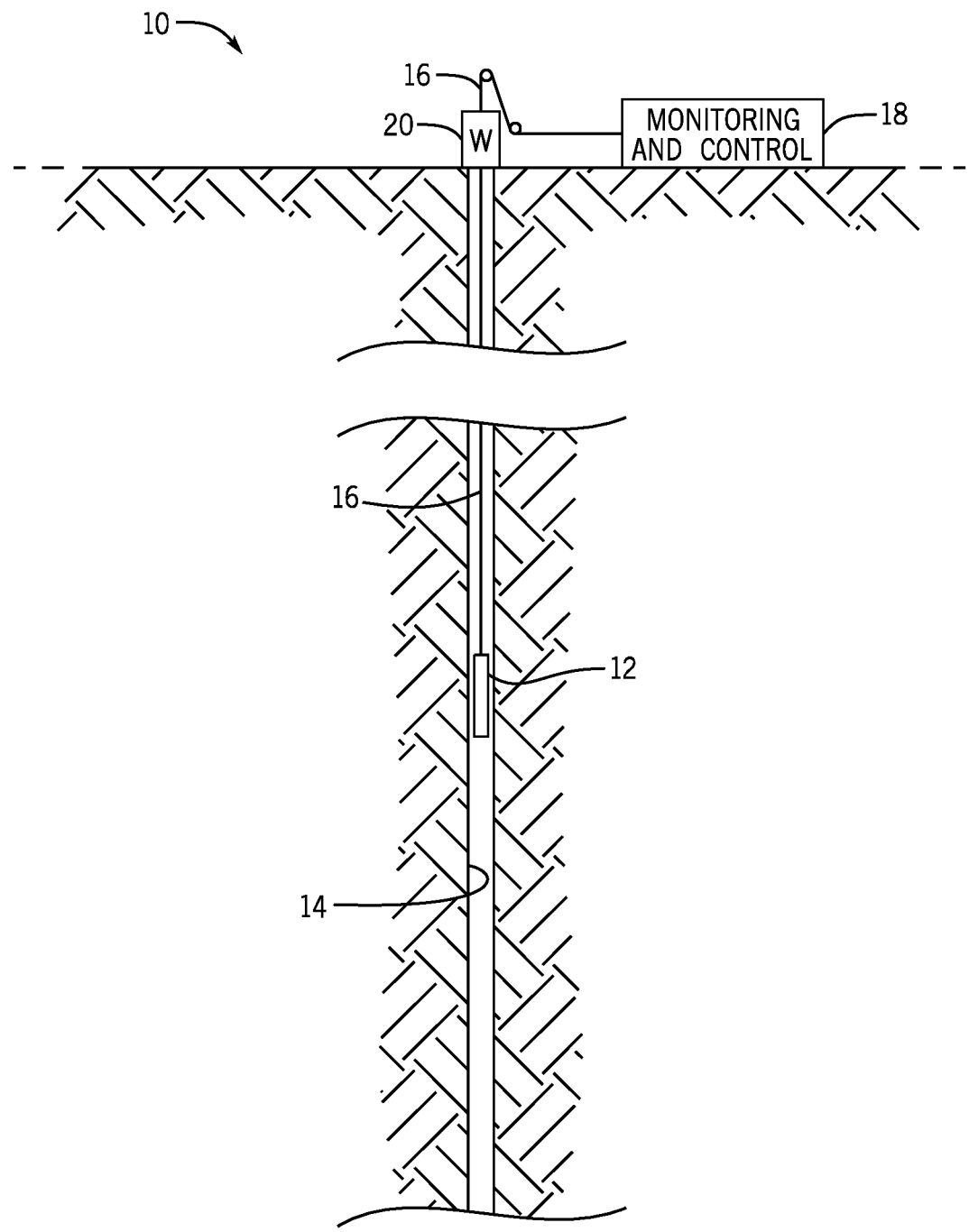
FIG. 1 generally depicts an apparatus including a downhole tool deployed within a well on a cable lowered through a wellhead assembly in accordance with one embodiment of the present disclosure.

Turning now to the drawings, an apparatus 10 for measuring downhole parameters in a well is depicted in FIG. 1 in accordance with one embodiment. In this depicted embodiment, a downhole tool 12 is suspended in a well 14 on a cable 16. The downhole tool 12 could be deployed in the well 14 as a single tool or as multiple tools coupled together in a tool string. The cable 16 may be a wireline cable with at least one conductor that enables data transmission between the downhole tool 12 and a monitoring and control system 18. In other instances, the wireline cable is a slickline or a non-conducting braided line. The downhole tool 12 may be raised and lowered within the well 14 (which may also be referred to as a borehole) via the cable 16 in any suitable manner. For instance, the cable 16 can be reeled from a drum in a service truck, which may be a logging truck having the monitoring and control system 18. Although the downhole tool 12 is depicted in FIG. 1 as being deployed via a cable 16, the downhole tool 12 could be deployed within the well 14 in any other suitable manner, such as with coiled tubing. Further, while the apparatus 10 is shown in FIG. 1 at an onshore well 14, the apparatus 10 could be used with an offshore well in full accordance with the present techniques.

The monitoring and control system 18 controls movement of the downhole tool 12 within the well 14 and receives data from the downhole tool 12. The monitoring and control system 18 can include one or more computer systems or devices. The system 18 can receive data from the downhole tool 12, and this data can be stored, communicated to an operator, or processed. Although generally depicted in FIG. 1 at a wellsite, it is noted that the system 18 could be positioned elsewhere, and that the system 18 could be a distributed system with elements provided at different places near or remote from the well 14. For example, a local component of the system 18 may be located at the wellsite for controlling operation of the downhole tool 12 and receiving data from the tool 12, but the received data could be processed by a different portion of the system 18 at another location.

Figure 2:
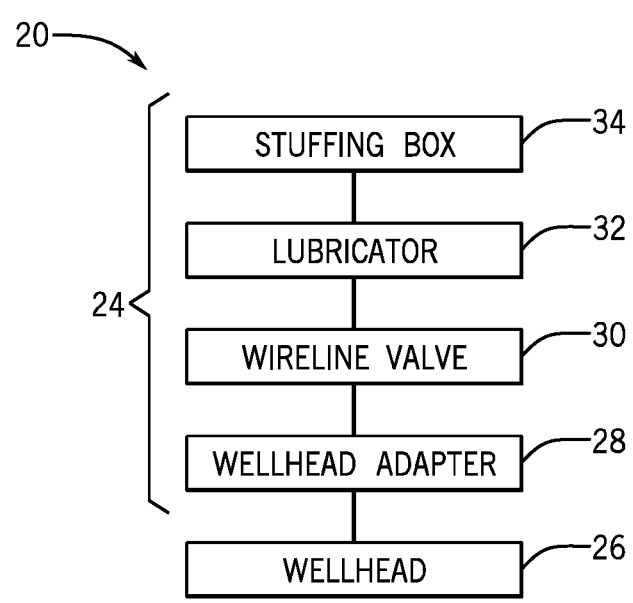
FIG. 2 is a block diagram depicting the wellhead assembly of the apparatus of FIG. 1 in accordance with one embodiment.

The downhole tool 12 can be lowered via the cable 16 into the well 14 through a wellhead assembly 20. By way of example, various components of a wellhead assembly 20 having stack equipment 24 installed at a wellhead 26 are depicted in FIG. 2 in accordance with one embodiment. The depicted stack equipment 24, which may also be referred to as a stack assembly or a pressure-control string, includes a wellhead adapter 28 for facilitating connection of the stack equipment 24 to the wellhead 26. The stack equipment 24 also includes a wireline valve 30 coupled above the adapter 28 and a lubricator 32 coupled above the wireline valve 30. As will be understood by the skilled artisan, the wireline valve 30 (e.g., a wireline blowout preventer) may be closed to seal about the cable 16, and the lubricator 32 can include one or more pipes for receiving the tool 12 and facilitating running of the tool 12 into and out of the well 14. Further, the cable 16 may be run through a stuffing box 34 coupled above the lubricator 32. In other instances, the stuffing box 34 can be used as a snubbing unit or a stripper, such as for running coiled tubing into the well 14. The stuffing box 34 can include a seal that forms a pressure barrier about the tubing or cable run into the well 14.

Although the stack equipment 24 is described above as having certain components, it will be appreciated that the stack equipment 24 could have other components in addition to, or in place of, those described above. A few examples of such other components include a tool catcher, a cable cutter, a valve, and a sheave for running the cable 16 or tubing into the wellhead assembly 20. Additionally, although the stack equipment 24 may be connected directly to the wellhead 26 in some embodiments, in other instances the stack equipment 24 could be connected via an intermediate device, such as a production tree mounted on the wellhead 26.

Figure 3:
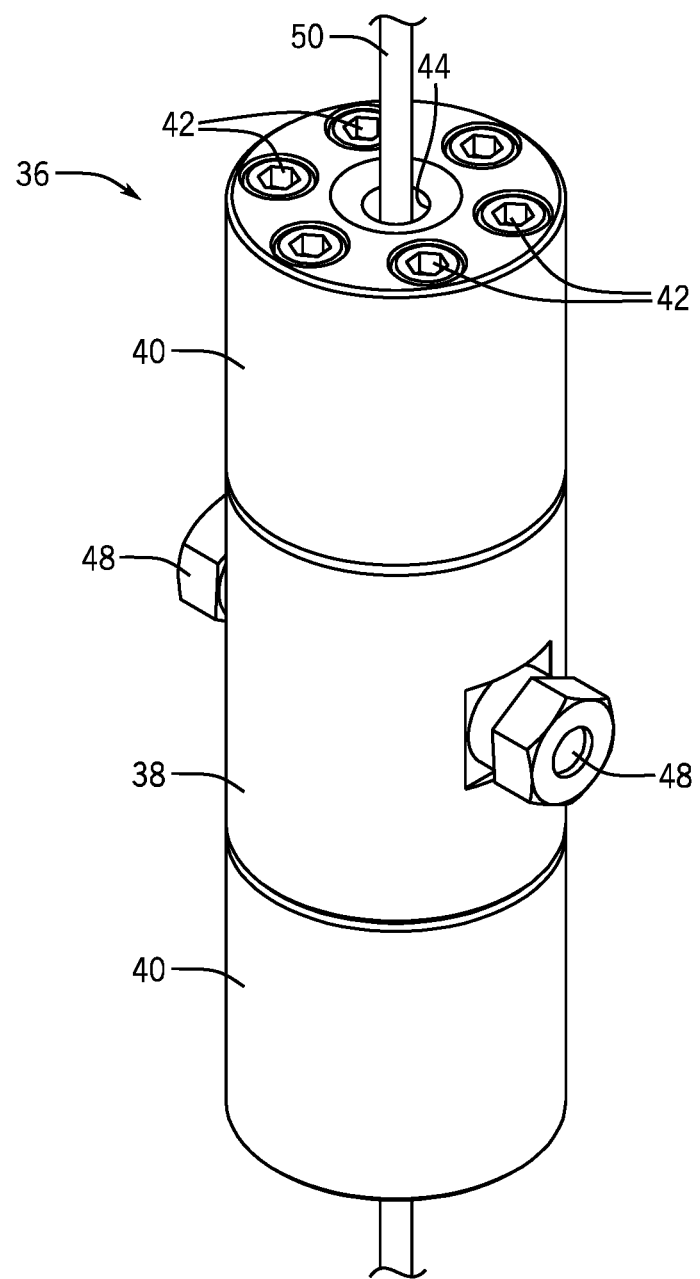
FIG. 3 is a perspective view of a sealing assembly that can be used as a stuffing box of the wellhead assembly for sealing against a cable or tubing run into a well in accordance with one embodiment.

In accordance with certain embodiments of the present technique, a pressure-control device includes a seal that rolls along a cable or tubing moving through a bore of the pressure-control device. An example of such a pressure-control device 36, which may also be referred to as a sealing assembly 36, is depicted in FIGS. 3-6. In some instances, the stuffing box 34 is provided in the form of the pressure-control device 36, but it will be appreciated that the pressure-control device 36 could also or instead be used for other applications. In this depicted embodiment, the pressure-control device 36 includes a housing or body having removable caps 40 fastened to a main body 38 via bolts 42. This housing includes a bore 44 extending through the main body 38 and the caps 40. As shown in FIG. 3, a cable or tubing 50 (e.g., a wireline cable or coiled tubing) may be run through the pressure-control device 36 via the bore 44. The main body 38 can include ports 46 (FIG. 6) for conducting fluid, such as grease, oil, or glycol, to the bore 44 from an external source. Plugs 48 may be used to close the ports 46 when not in use.

Figure 4:
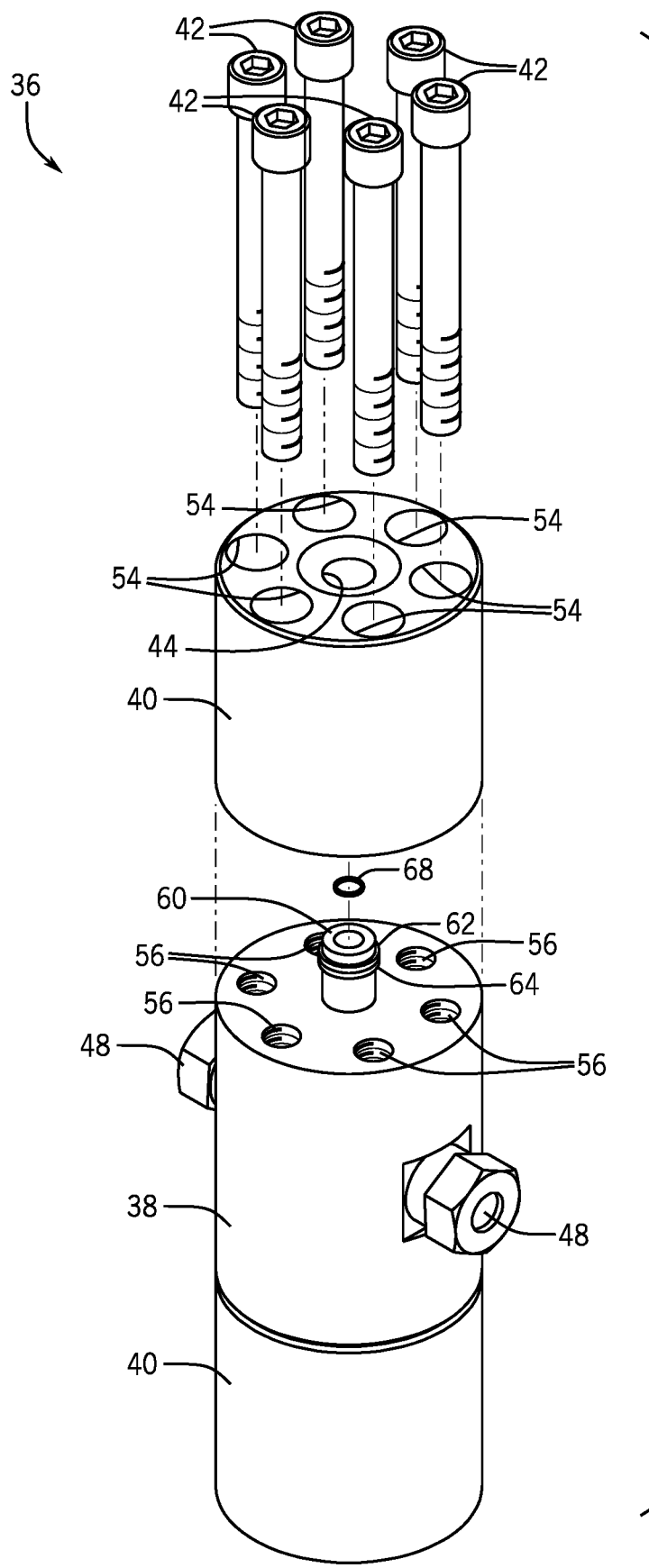
FIG. 4 is an exploded view of the sealing assembly of FIG. 3 and shows a rolling seal for sealing against the cable or tubing in accordance with one embodiment.
Figure 5:
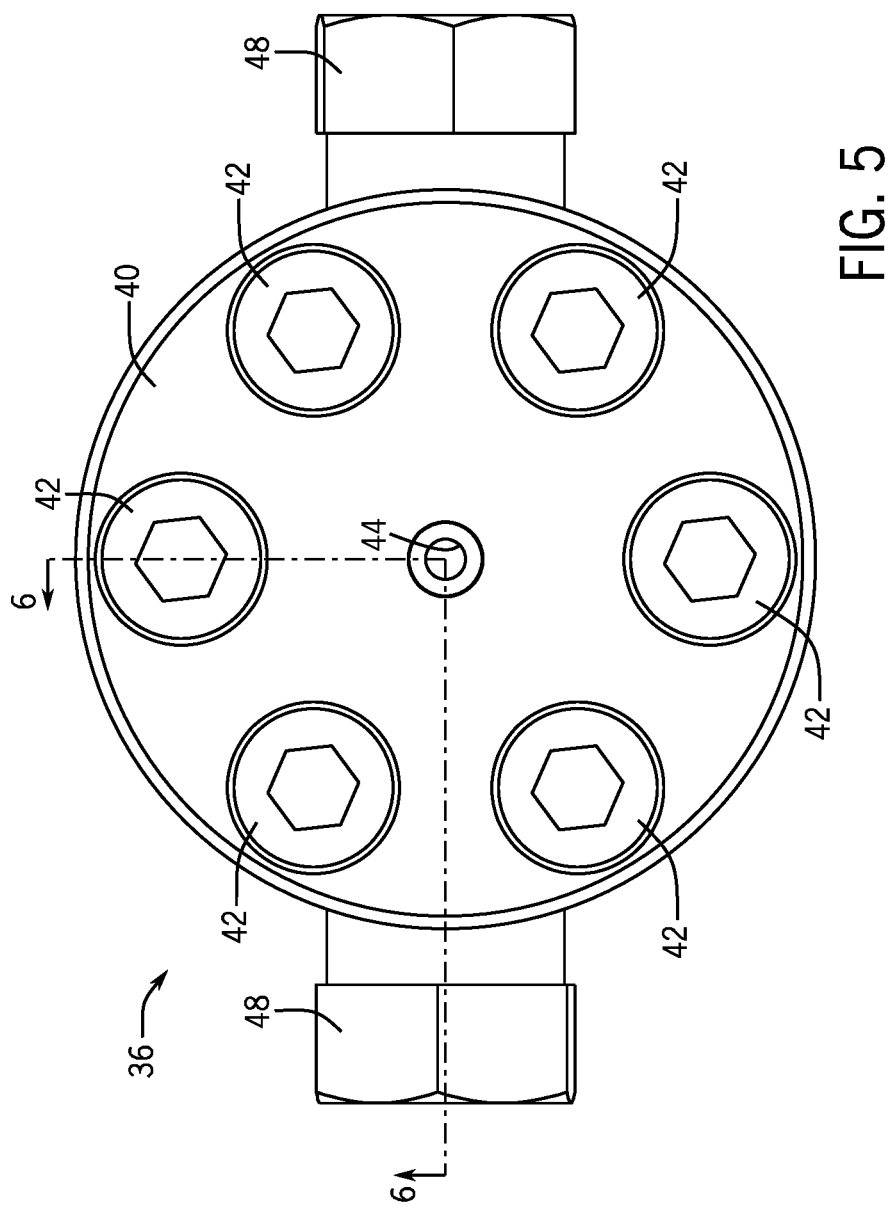
FIG. 5 is a top plan view of the sealing assembly of FIG. 3.
Figure 6:
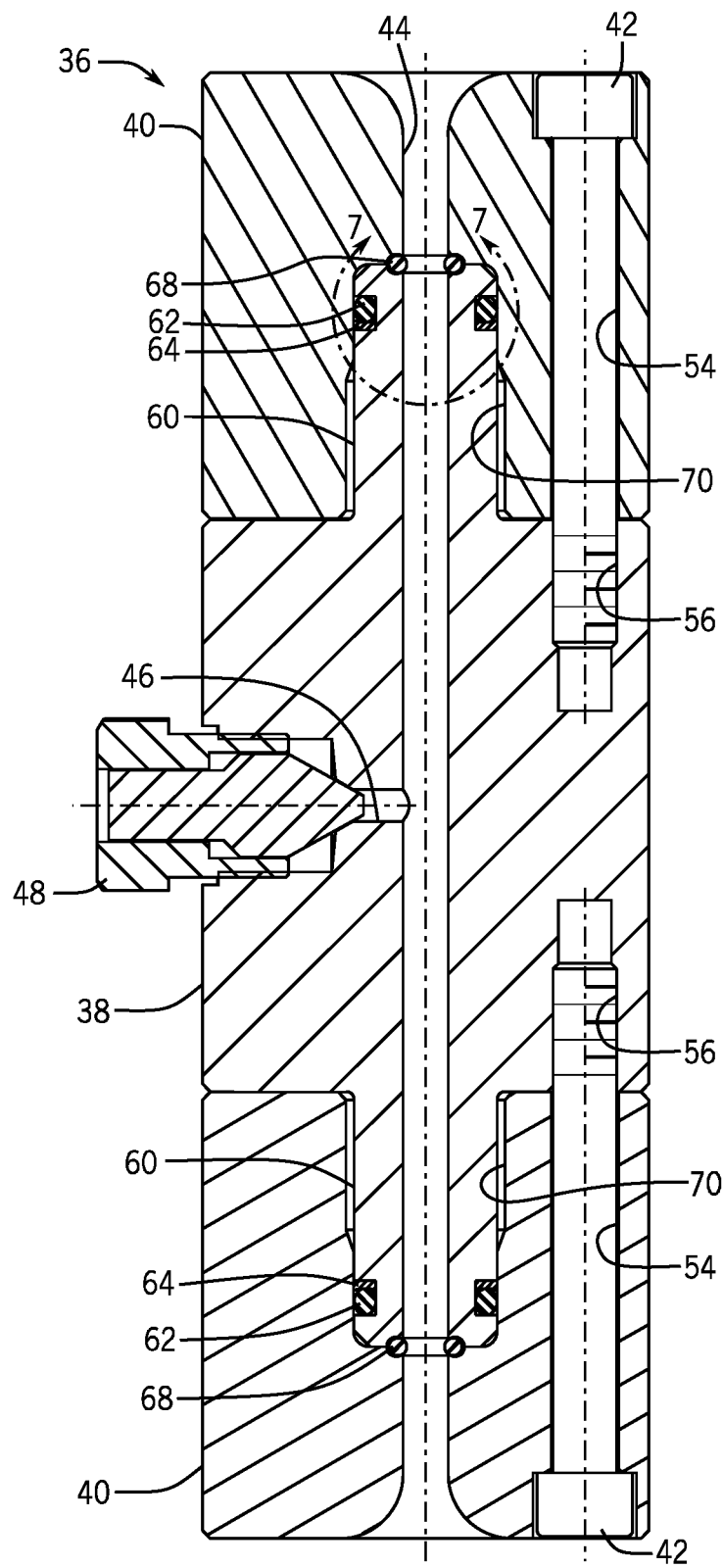
FIG. 6 is a section view of the sealing assembly of FIGS. 3-5 and shows two rolling seals disposed within a housing for sealing against the cable or tubing in accordance with one embodiment.
Figure 7:
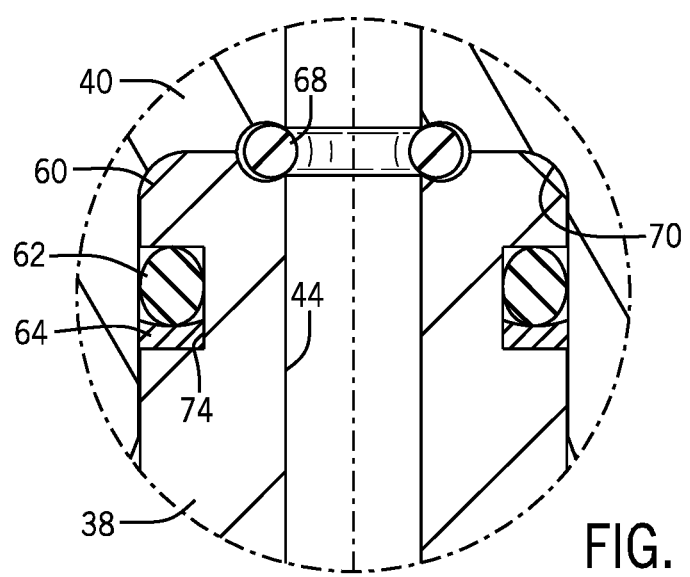
FIGS. 7 and 8 are detail views of one of the rolling seals of FIG. 6 disposed in a seal groove between two body components of the sealing assembly in accordance with one embodiment.

As may be better appreciated from FIGS. 4 and 6, the caps 40 can be fastened to the main body 38 with bolts 42 received through mounting holes 54 in the caps 40 and threaded into mating holes 56 in the main body 38. Although FIG. 4 is a partially exploded view of the pressure-control device 36, it will be appreciated that the upper and lower caps 40 may be coupled to the main body 38 in the same manner. In the presently depicted embodiment, the main body 38 includes protruding portions or necks 60 with seals 62 (e.g., o-rings) and backing rings 64. The necks 60 are received in recesses 70 of the caps 40, and the seals 62 seal between the main body 38 and the caps 40. In some instances, the seals 62 and backing rings 64 are disposed in seal grooves 74 in the necks 60, such as generally depicted in FIG. 7.

In at least some embodiments, the pressure-control device 36 includes at least one rolling annular seal 68 for sealing around a tubing, cable, rod, or other elongate member received in a bore of the pressure-control device 36 to form a pressure barrier. As depicted in FIGS. 3-6, by way of example, the pressure-control device 36 includes two rolling seals 68 that extend into the bore 44 for sealing against a cable or tubing 50. Further, in at least some embodiments the seals 68 are toroidal seals, as generally shown in FIG. 4. The seals 68 can be elastomer seals or can be formed of any other suitable material. Components of the pressure-control device 36 (including, for instance, the rolling seals 68 and the housing components forming bore 44) may be sized to accommodate the diameters of cables, tubing, or other elongate members expected to be received in the bore 44. Having multiple seals 68 provides redundancy, though the pressure-control device 36 could include just a single rolling seal 68 in other embodiments. Multiple pressure-control devices 36 could also be used together for redundancy.

The seals 68 of various embodiments may have different working ranges depending on their size and composition. That is, the seals 68 may be constructed in different manners to enable each seal 68 to seal against and roll along cables, tubing, or other elongate members having widths within a certain range. Smaller seals 68 can be used for sealing against wireline cables, for example, while larger seals 68 could be used for sealing against coiled tubing or pipe strings. In at least some instances, the seals 68 can have a working range that would accommodate upsets on the elongate member (e.g., tool joints on a pipe string) having diameters within the working range.

Figure 8:
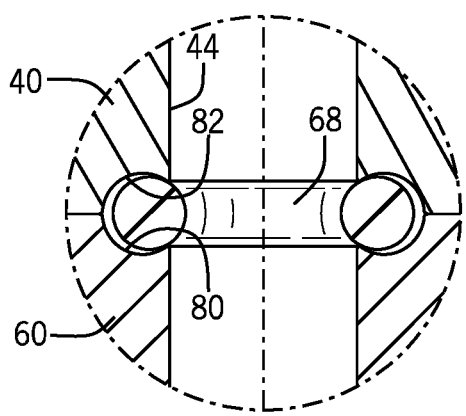

Further, while the number and placement of the rolling seals 68 may also be varied in different embodiments, the rolling seals 68 of FIG. 6 are provided in seal grooves defined by the main body 38 and caps 40 of the pressure-control device 36. More specifically, these rolling seals 68 are disposed at ends of the necks 60 within seal grooves located between the necks 60 and the caps 40. As shown in greater detail in FIGS. 7 and 8, the seal groove receiving the rolling seal 68 includes two portions—a groove or recess 80 formed in the main body 38 (i.e., in the neck 60) and a groove or recess 82 formed in the cap 40.

The rolling seal 68 is positioned in the seal groove (i.e., between the two opposing recesses 80 and 82) and protrudes into the bore 44 to seal against an elongate member (e.g., a cable or tubing) received through the seal 68, with which it has an interference fit. As the elongate member moves axially through the bore 44, friction between the elongate member and the inner surface of the seal 68 causes the seal 68 to dynamically roll along the elongate member while maintaining sealing contact. That is, the seal 68 repeatedly turns itself inside out as the elongate member passes through, and drags along, the inner surface of the seal 68. For this reason, the rolling seals 68 may also be referred to as inverting seals. This rolling or inverting motion is in contrast to static seals used in stripping operations, for example, in which abrasion of a cable or tubing along a stationary seal face is a common failure mode and seal life largely depends on abrasion resistance.

Figure 9:
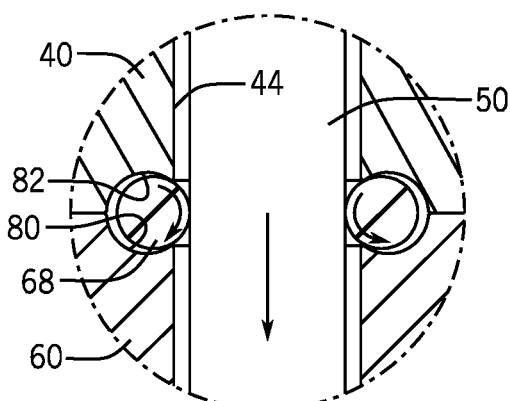
FIGS. 9 and 10 generally depict rolling motion imparted on the rolling seal by the cable or tubing moving axially through the seal and the bore of the housing in accordance with one embodiment.
Figure 10:
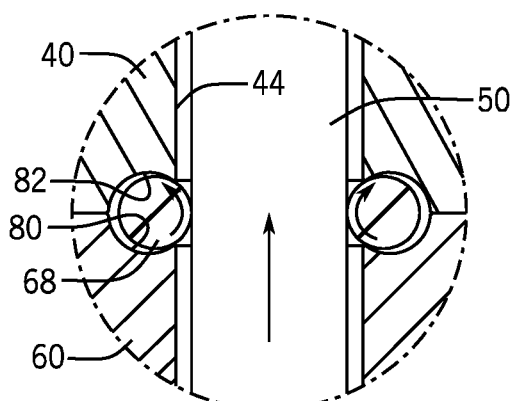

Examples of this rolling motion by the seal 68 are generally depicted in FIGS. 9 and 10. For instance, as generally shown in FIG. 9, a cable or tubing 50 may be lowered through the bore 44 (e.g., run into a well 14) along the abutting inner surface of the rolling seal 68. Friction between the seal 68 and the exterior of the moving cable or tubing 50 can cause the inner surface of the seal 68 to move tangentially in the same axial direction as the cable or tubing 50 (i.e., downward in FIG. 9). As the seal 68 is held at a given axial location along the bore 44 (i.e., between the recesses 80 and 82), this tangential movement of the inner surface of the seal 68 imparts a rolling motion to the body of the seal 68 (which is generally represented by the curved arrows in FIG. 9), with an outer portion of the seal moving in a direction opposite that of the inner portion. When the cable or tubing 50 is instead raised through the bore 44 (e.g., when being pulled from the well 14), this movement is reversed—the upward movement of the cable or tubing 50 causes the inner surface of the seal 68 to move upward and the seal 68 rolls within its seal groove along the cable or tubing 50 as generally depicted in FIG. 10. The dynamic rolling motion of the seal 68 may increase seal life compared to a static seal and may facilitate use of the seal 68 for stripping greater lengths (e.g., thousands of feet) of wireline cables or coiled tubing.

The main body 38 and the caps 40 may be made of stainless steel or another suitable material with a low coefficient of friction to facilitate the rolling motion of the seals 68 between the surfaces of the recesses 80 and 82. In at least some embodiments, the surfaces of the recesses 80 and 82 can be treated to reduce friction with the seal 68. This could include one or more of polishing, coating, plating, or cladding treatments, for instance, to reduce resistance to the rolling motion imparted on the seals 68 by an elongate member (e.g., the cable or tubing 50). The exterior of such an elongate member could also or instead be treated, such as via surface abrasion or a coating, to increase friction and facilitate the rolling motion of the seals 68 induced by movement of the elongate member.

Figure 11:
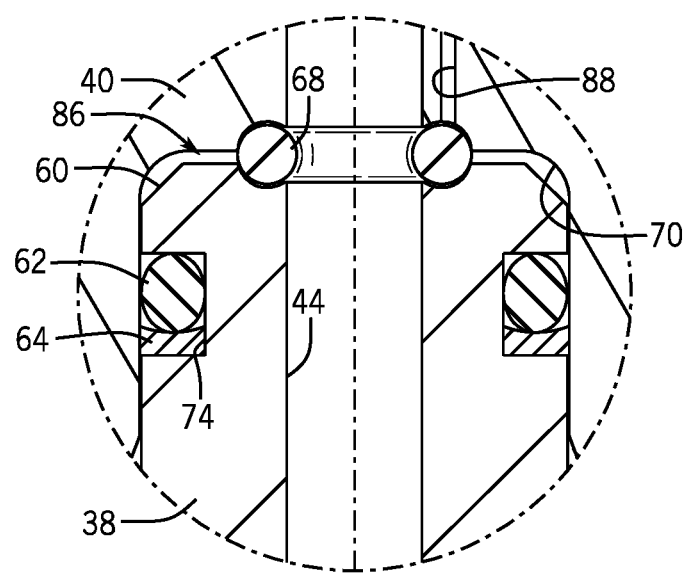
FIGS. 11 and 12 generally depict a rolling seal disposed between two body components of a sealing assembly in which the distance between the two body components may be varied to compress the rolling seal and change its inner diameter in accordance with one embodiment.
Figure 12:
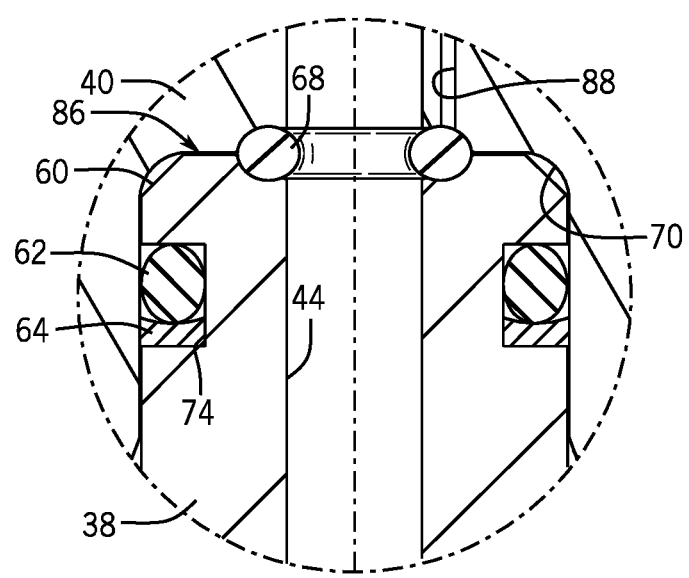

In some embodiments, the working range of the rolling seals 68 may be changed by varying compression of the seals 68 within the pressure-control device 36 to change the inner diameter of the seals 68. One example of this is generally shown in FIGS. 11 and 12. In this depicted embodiment, a rolling seal 68 is positioned in a seal groove between the main body 38 and the cap 40 in a manner similar to that described above with respect to FIGS. 7-10. The rolling seal 68 functions to seal against and roll along a cable, tubing, or other elongate member, as also described above. But in this embodiment the sealing assembly is designed such that the main body 38 and the cap 40 are moveable with respect to one another to control compression of the seal 68 between these two body components.

As depicted in FIG. 11, for instance, the main body 38 and the cap 40 are coupled together with a gap 86 between these components and the seal 68 (positioned within the seal groove) has an inner diameter for receiving, sealing against, and rolling along an elongate member with a diameter within a working range of the seal 68. As generally shown in FIG. 12, however, the main body 38 and cap 40 can be moved closer together to reduce the width of the gap 86 and increase compression of the seal 68 between the main body 38 and the cap 40. This increased compression can cause the seal 68 to extend further into the bore 44, reducing the inner diameter and working range of the seal 68. One or more conduits 88 can be used in this or other embodiments to provide cooling or lubrication to the seal 68, such as during rolling of the seal 68 along the elongate member. Additionally, plates could be provided above or below the seal 68 to extend into the bore 44 and reduce axial extrusion of the seal 68 from the movement of the elongate member through the bore 44.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An apparatus comprising:
    a stuffing box including:
    a body with a bore for receiving a tubing or wireline cable; and
    a rolling seal positioned in a seal groove in the body along the bore to seal against the tubing or wireline cable, wherein the rolling seal and the body are arranged to allow the rolling seal to rotate within the body so as to roll along the tubing or wireline cable in response to movement of the tubing or wireline cable through the body and friction between the rolling seal and the tubing or wireline cable;
        wherein the body includes first and second body members coupled together, the bore extends through each of the first and second body members, and the seal groove in which the rolling seal is positioned includes a first seal groove portion formed in the first body member and a second seal groove portion formed in the second body member; and
        wherein the second body member includes a cap fastened to the first body member.

2. The apparatus of claim 1, wherein the body includes a third body member coupled together with the first and second body members, the bore extends through the third body member as well as through the first and second body members, the stuffing box includes an additional rolling seal positioned in an additional seal groove in the body along the bore, the additional rolling seal and the body are arranged to allow the additional rolling seal to rotate within the body so as to roll along the tubing or wireline cable in response to movement of the tubing or wireline cable through the body and friction between the additional rolling seal and the tubing or wireline cable, and the additional seal groove in which the additional rolling seal is positioned includes a first additional seal groove portion formed in the first body member and a second additional seal groove portion formed in the third body member.

3. The apparatus of claim 1, comprising an additional seal that seals between the first and second body members.

4. The apparatus of claim 3, wherein the additional seal is positioned along a neck of the first body member that is received in a recess of the second body member.

5. The apparatus of claim 1, comprising the tubing, wherein the tubing includes a coiled tubing that is received in the bore of the body and the rolling seal seals against the coiled tubing.

6. The apparatus of claim 1, comprising the wireline cable, wherein the wireline cable includes a wireline or slickline that is received in the bore of the body and the rolling seal seals against the wireline or slickline.

7. The apparatus of claim 1, wherein the stuffing box is installed at a wellhead.

8. The apparatus of claim 7, comprising a wireline valve and a lubricator coupled to the stuffing box.

9. An apparatus comprising:
    a stuffing box including:
        a housing having a bore to receive a cable or tubing; and
        an inverting seal positioned within the housing along the bore to seal against the cable or tubing, wherein the inverting seal is an annular seal that turns inside out in response to dragging movement of the cable or tubing through the housing along an inner surface of the annular seal while the annular seal is held at an axial position along the bore
    wherein the housing includes a removable cap coupled to a main housing body and the bore extends through each of the removable cap and the main hosing body;
    wherein the inverting seal is disposed within a seal groove defined by the removable cap and the main housing body.

* * * * *